United States Patent [19]
Webster

[11] Patent Number: 5,617,893
[45] Date of Patent: Apr. 8, 1997

[54] VACUUM RELIEF VALVE

[75] Inventor: Earl D. Webster, Harriman, Tenn.

[73] Assignee: Transport Service Co., Hinsdale, Ill.

[21] Appl. No.: 509,869

[22] Filed: Aug. 1, 1995

[51] Int. Cl.$^6$ ..................................................... F16K 24/00
[52] U.S. Cl. .......................... 137/526; 137/541; 137/542; 99/337
[58] Field of Search ....................... 137/526, 541, 137/542, 454.6, 493.9; 251/118, 368; 99/337; 220/303, 304

[56] References Cited

U.S. PATENT DOCUMENTS

| | | |
|---|---|---|
| 204,135 | 5/1878 | Convery . |
| 1,525,861 | 2/1925 | Franklin ................................. 137/526 |
| 1,740,567 | 12/1929 | Becker . |
| 1,819,827 | 8/1931 | Thwaits . |
| 2,270,469 | 1/1942 | Osborn, Jr. ............................ 137/526 |
| 2,784,737 | 3/1957 | Kelly . |
| 3,145,724 | 8/1964 | Pelzer . |
| 3,171,423 | 3/1965 | Dillon . |
| 3,604,450 | 9/1971 | Botkin . |
| 4,273,153 | 6/1981 | Brown . |
| 4,998,554 | 3/1991 | Rogers . |
| 5,004,011 | 4/1991 | Linder et al. ........................ 251/368 |

OTHER PUBLICATIONS

"Pressure Relief Vents for Tank Transports from Girard Equipment Inc.", Girard Equipment Inc., Rahway, New Jersey (1994).

"NOW!. . . a low cost vent that keeps your tanker safe!. . ." (1994).

"Certified Double Acting Olson Vent T–21642" (1994).

*Primary Examiner*—Edward K. Look
*Assistant Examiner*—Christopher Verdier
*Attorney, Agent, or Firm*—Fitch, Even, Tabin & Flannery

[57] ABSTRACT

A vacuum breaker valve assembly is provided including a housing mountable to a transport tank. The housing has a wall defining a passageway through the housing and there is a valve member movable within the housing. Structure is provided for permitting the valve member to move in response to variations in tank pressure between (1) and open state when atmospheric air external of the tank is allowed to travel through the passageway and into the tank once a predetermined vacuum pressure condition is reached, and (2) a closed state wherein the passageway is sealed to prevent atmospheric air travel into the tank when the predetermined vacuum pressure condition in the tank has not been reached. A housing lid is mounted to the housing and includes a vent hole for allowing atmospheric air to enter the housing passageway. A bottom wall integral with the housing wall includes a vent hole therethrough communicating with the interior of the tank. The bottom wall vent hole is sized sufficiently small to prevent the valve member moving structure from fitting therethrough.

13 Claims, 3 Drawing Sheets

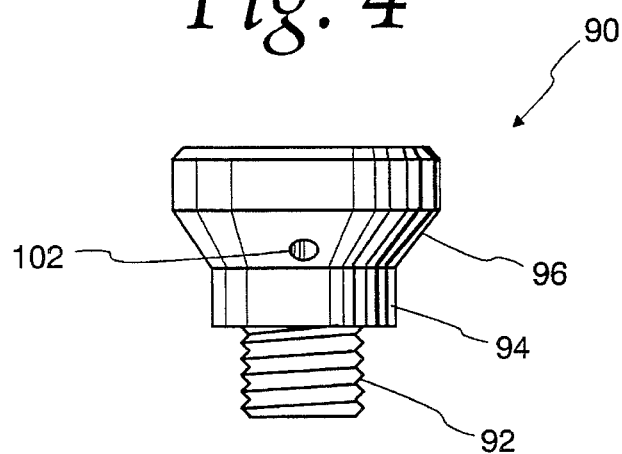
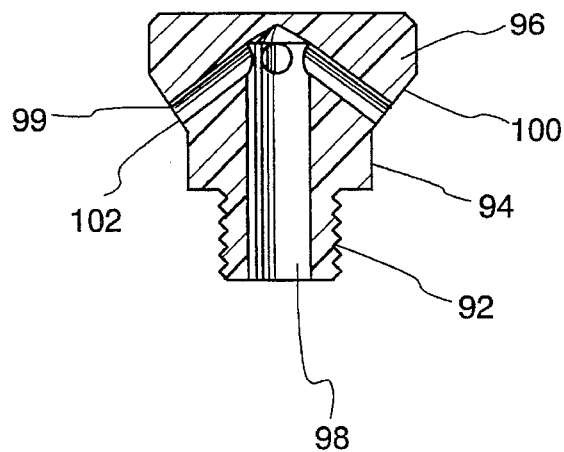
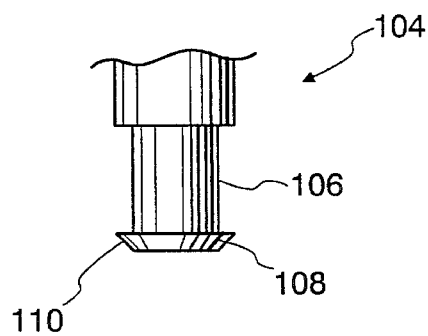

VACUUM RELIEF VALVE

FIELD OF THE INVENTION

The present invention relates to a vacuum breaker valve assembly and, more particularly, to a vacuum breaker valve assembly used with a transport tank for transporting bulk quantities of food-grade liquids.

BACKGROUND OF THE INVENTION

Transport tanks used to transport bulk quantities of food-grade liquids, such as by rail car or truck, normally incorporate vacuum breaker valves to allow atmospheric air to enter the tank if vacuum conditions develop therein. In this manner, the vacuum breaker valves prevent the tank from being damaged or destroyed by vacuum conditions in the tank such as by implosion.

Transport tank vacuum conditions can develop in a variety of different ways. For example, loading the tank with hot product can cause a vacuum condition to develop within the tank upon cooling of the product and air inside the tank. Localized pockets of vacuum pressure conditions can be generated during food product transport as the liquid in the tank is agitated in response to the acceleration or deceleration and the vibrations of the vehicle carrying the tank. Once the product has reached its destination and is unloaded, atmospheric air must be allowed to replace discharged product as otherwise a tank vacuum condition can develop during unloading. After unloading a tank and before loading with product, the tank is normally cleaned with a fairly hot solution, typically at a temperature of approximately 190° F. After cleaning the tank, the tank is closed and the cooling of the hot air in the tank generated from the cleaning process can cause a vacuum condition to develop in the tank.

One example of a commercially available vacuum breaker for use with transport tanks utilizes a spring-loaded valve stem with the spring normally biasing a vacuum plug to cover an off-center atmospheric air vent in the vent body. The vacuum plug is caused to move against the bias force of the spring when a vacuum develops in the tank allowing atmospheric air to enter through the vent into the interior of the tank.

During tank transport, the aforesaid vacuum breaker assembly may be caused to open even without the presence of a vacuum in the tank due to forces generated during transportation of the tank as when the vehicle transporting the tank accelerates and decelerates or rides over uneven surfaces such that the tank tends to vibrate causing the spring to compress opening the atmospheric air vent. Rough transportation conditions also cause liquid product to splash in the tank which, in combination with the opening of the valve assembly during transport, can cause product to spill out of the vent opening onto the exterior of the tank. This is particularly undesirable when food-grade liquids are being transported in that such product spillage creates the impression that the load has somehow been contaminated, in some instances causing the load to be rejected. Moreover, splashing of the product in the tank or other factors can dislodge the spring from the valve stem causing it to fall into the load, leaving the atmospheric vent open and the product exposed to contaminants from the exterior of the tank.

Thus, there is a need for a vacuum breaker valve assembly used with a tank for transporting bulk quantities of food-grade liquids which allows the flow of atmospheric air into the tank during vacuum conditions in the tank while also limiting leakage of product in the tank through the valve assembly to the exterior of the tank during transport of the tanks. Further, there is a need for a vacuum breaker valve assembly which achieves the above and also prevents splashing product from causing the valve spring to dislodge from the valve assembly and fall into the load.

SUMMARY OF THE INVENTION

In accordance with the present invention, a vacuum breaker valve assembly for use in a transport tank for transporting bulk quantities of liquids is provided which overcomes the aforementioned problems of the prior art.

In one form of the invention, the vacuum breaker valve assembly includes a housing mountable to a transport tank. The housing has a wall defining a passageway through the housing and a valve member movable within the housing. Structure is provided for permitting the valve member to move in response to variations in tank pressure between (1) an open state wherein atmospheric air external of the tank is allowed to travel through the passageway and into the tank once a predetermined vacuum pressure condition is reached, and (2) a closed state wherein the passageway is sealed to prevent atmospheric air travel into the tank when the predetermined vacuum pressure condition in the tank has not been reached. A housing lid is mounted to the housing and includes a vent hole for allowing atmospheric air to enter the housing passageway. A bottom wall integral with the housing wall includes a vent hole therethrough communicating with the interior of the tank. The bottom wall vent hole is sized sufficiently small to prevent the valve member moving structure from fitting therethrough.

The valve member moving structure may include a flexible seal member mounted in the housing having opposite sides. The flexible seal member has an opening therethrough defining a valve seat around the opening. The housing has a first region between the lid and one side of the seal member and a second region between the bottom wall and the other side of the seal member. Structure for biasing the valve member into sealing engagement with the seal member valve seat with a predetermined bias force to seal the seal member opening in the closed state is provided. The predetermined vacuum pressure is sufficient to overcome the predetermined bias force to cause the valve member to unseat from the seal member valve seat in the open state.

The valve member may include a stem extending through the seal member opening with the stem having enlarged ends. The biasing structure can include a helical spring mounted in compression between one enlarged end of the stem and the one side of the seal member to bias the other enlarged end of the stem against the seal member valve seat to seal the seal member opening and to bias the one enlarged end towards the lid hole with the valve member in the closed state.

With the vacuum breaker valve assembly of the present invention, the possibility of splashing product in the tank causing the spring to dislodge from the stem is significantly reduced as the spring is contained in an upper portion of the vacuum breaker valve assembly housing. Thus, for liquid product to reach the spring, the product must travel through the small vent hole in the bottom wall and then through the seal member opening before reaching the spring. Even if such occurs and the spring becomes dislodged from the stem, both the stem and the spring are prevented from dropping into the tank by the bottom wall of the housing.

The housing wall may be cylindrical and have a central longitudinal axis. The bottom wall and the lid vent holes can be aligned along the central axis.

In one form, the biasing structure is mounted between one stem and one side of the seal member for normally urging the one stem end towards the lid opening and the other of the stem enlarged ends into engagement with the other side of the seal member to both limit leakage of product in the tank through the housing flow path and to prevent travel of air from outside the tank through the flow path and to the interior of the tank.

The cylindrical wall can include first and second annular inner surface portions of different diameters forming an annular shoulder therebetween in the housing. The seal member can be seated on the annular shoulder in the housing.

The biasing structure has a predetermined bias force which may be selected to allow a predetermined vacuum pressure condition in the interior of the tank to cause the other enlarged end of the stem to move out of engagement with the other side of the seal member against the bias force for permitting air from outside the tank to travel through the flow path to the interior of the tank.

The housing, lid, and valve member may be formed from a teflon material and the seal member may be formed from a neoprene rubber material.

The biasing structure can be a helical spring mounted in compression between the one stem end and the one side of the seal member.

The housing may include an outwardly flared upper lip. The tank can include a shank with the housing upper lip being supported by the shank. The shank can be threaded to cooperate with a threaded nut to secure the lid to the housing upper lip.

In another form of the invention, the valve member is movable in the housing between (1) a first position in which the valve assembly is closed to seal the tank from atmospheric air, and (2) a second position in which the valve assembly is open to admit atmospheric air to the tank when the tank reaches a predetermined vacuum pressure condition. A spring biases the movable member towards the first position with a predetermined biasing force. An annular flexible seal member having a central aperture therethrough and opposed sides mounted in the housing is provided. The housing has a first region on one side of the seal member and a second region on the other side of the seal member with the first region communicating with the second region with the valve member in the second position. An annular bottom housing wall cooperates with the other side of the seal member to define the second region and has a central aperture aligned with the seal central aperture. The stem extends through the seal central aperture and has a first enlarged end in the first region and a second enlarged end in the second region. The second enlarged end is sized sufficiently large to prevent the stem from fitting through the bottom wall aperture and dropping into the tank and to close the sealing member aperture sealing the first and second regions from each other with the valve member in the first position. The lid structure is securely mounted to the housing to cooperate with one side of the sealing member to define the first region. The lid structure has a central aperture for entry of atmospheric air into the housing and is aligned with the sealing member and bottom wall apertures. The stem first enlarged end substantially blocks the lid means central aperture to limit leakage of product in the tank through the lid structure aperture with the valve member in the first position.

BRIEF DESCRIPTION OF THE DRAWINGS

FIG. 4 is a side elevation view of a vent cap for the valve assembly;

FIG. 5 is a cross-sectional view of the vent cap illustrated in FIG. 4; and

FIG. 6 is a side elevation view of the lower portion of a modified vent cap.

DETAILED DESCRIPTION OF THE PREFERRED EMBODIMENT

Figure 1:
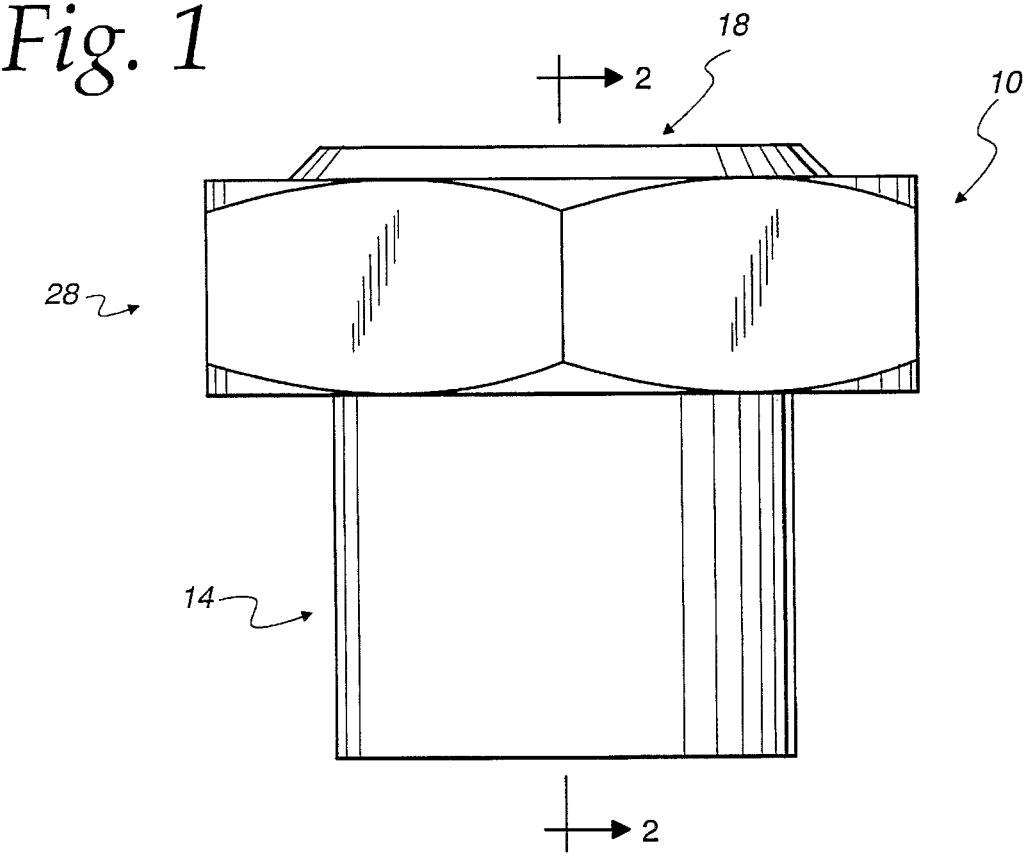
FIG. 1 is a side elevation view of the vacuum breaker valve assembly according to the present invention.

A vacuum breaker valve assembly 10 according to the present invention is shown generally in FIG. 1. The valve assembly 10 is intended for use with a transport tank for transporting bulk quantities of liquids, preferably of a food-grade type. As previously described, the tanks can develop vacuum conditions therein which must be relieved before damaging vacuum pressure conditions are reached such as where implosion may result. One typical manner in which such vacuum conditions develop occurs when the tank is either filled with hot liquids for transport or cleaned with hot solution such that upon cooling of the product in the tank and/or of the air therein as with cleaning, the pressure in the tank is reduced to potentially dangerous vacuum levels.

As such, vacuum breakers are used to provide a flow path between the outside atmosphere and the interior of the tank that is normally sealed unless the tank has reached a predetermined vacuum pressure condition. The predetermined vacuum pressure condition should be selected so that it is above damaging vacuum conditions taking into account the rated resistance of the tank structure to a vacuum condition therein along with an appropriate safety factor.

During tank transport, as the tank is subject to accelerations and decelerations and/or rough road conditions which can cause the tank to vibrate agitating the product in the tank, it is desirable for product leakage through the flow path of the vacuum breaker 10 to be substantially blocked. In this manner, product remains in the tank and does not spill out through the flow path and onto the tank and surrounding areas. Furthermore, it is also desirable that the spring 74 and valve member 58 which are used to regulate flow through the flow path be effectively isolated from such splashing product as otherwise they can become dislodged from one another and fall into the product in the tank. Finally, as a safety measure, it is also desirable that if such separation occurs, the valve member 58 and spring 74 are contained within the valve assembly housing 14 so as not to fall into the tank.

Figure 2:
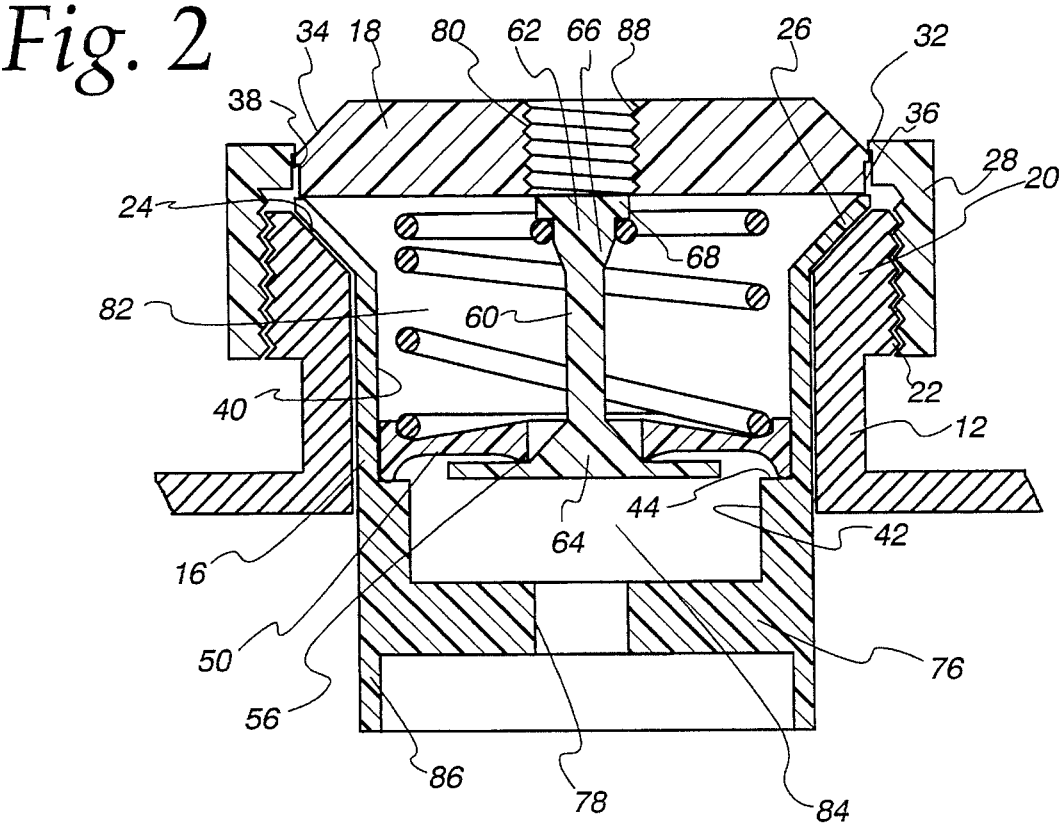
FIG. 2 is a cross-sectional view taken along line 2—2 of FIG. 1 illustrating a housing mounted to a tank and a valve member and spring within the housing with the valve assembly being closed to seal the tank from atmospheric air.

Referring to FIG. 2, the valve assembly 10 of the present invention accomplishes the above and includes a cup-shaped housing 14 having a cylindrical wall 16 covered by a lid 18 securely mounted to the housing 14. The vacuum breaker valve assembly 10 is adapted to be mounted to the threaded shank fitting 12 of a transport tank. While the valve assembly 10 and threaded shank 12 can be a wide variety of different sizes, typically the shank 12 will have a three inch diameter with the valve assembly 10 being sized to fit the shank 12 accordingly. The housing 14 is mounted to the tank so that a portion of the housing 14 extends into the interior of the tank while a portion of the housing 14 remains outside the tank. To mount the housing 14 to the tank, the shank fitting 12 of the hank can be provided with an annular flange 20 including outwardly directed threads 22. An upper inclined surface 24 on the flange 20 is formed radially inwardly of the threads 22. The housing 14 has an outwardly flared upper lip 26 integral with the housing wall 16 with the upper lip 26 being angled so as to rest upon the upper inclined surface 24 of the shank 12.

The lid 18 has a circular shape with a diameter thereof substantially corresponding to the diameter of the housing at its uppermost portion across the upper lip 26 so that when placed upon the housing, the lid 18 covers the top of the housing 14. To secure the lid 18 on the housing 14, an internally threaded nut 28 is screwed onto the shank 12 securely capturing the lid 18 on the housing 14. To enable such capturing, the nut 28 is provided with an upper circumferential ledge portion 30 extending radially inward from the flats of the nut 28. The ledge portion 30 includes an inwardly projecting annular portion 32 at the top thereof. The lid 18 has an annular ramp surface 34 and an annular straight wall portion 36 with the annular ramp surface 34 extending over the annular surface 36 to form an annular overhung portion 38 of the ramp surface 34. The ledge portion 30 and annular projection 32 form a shoulder therebetween which clamps down upon the overhung annular portion 38 of the lid 18 as the nut 28 is screwed down onto the shank 12 with the housing 14 resting in place on the upper inclined surface 24 of the shank 12 and the lid 18 resting on the upper lip 26 of the housing 14. In this manner, the housing 14 and lid 18 are securely maintained in place extending into the transport tank and allowing for valve assembly 10 operation as described herein. As one skilled in the art will appreciate, a wide variety of means can be used to secure the valve assembly 10 to the transport tank without departing from the invention described herein.

With the valve assembly 10 secured to the tank, the valve assembly 10 is operable to allow atmospheric air to enter into the tank interior space once a predetermined vacuum pressure condition is present therein. In addition, the valve assembly 10 also is constructed to limit leakage of product within the tank through the valve assembly to the exterior of the tank as during transport of the tank and its contents.

Figure 3:
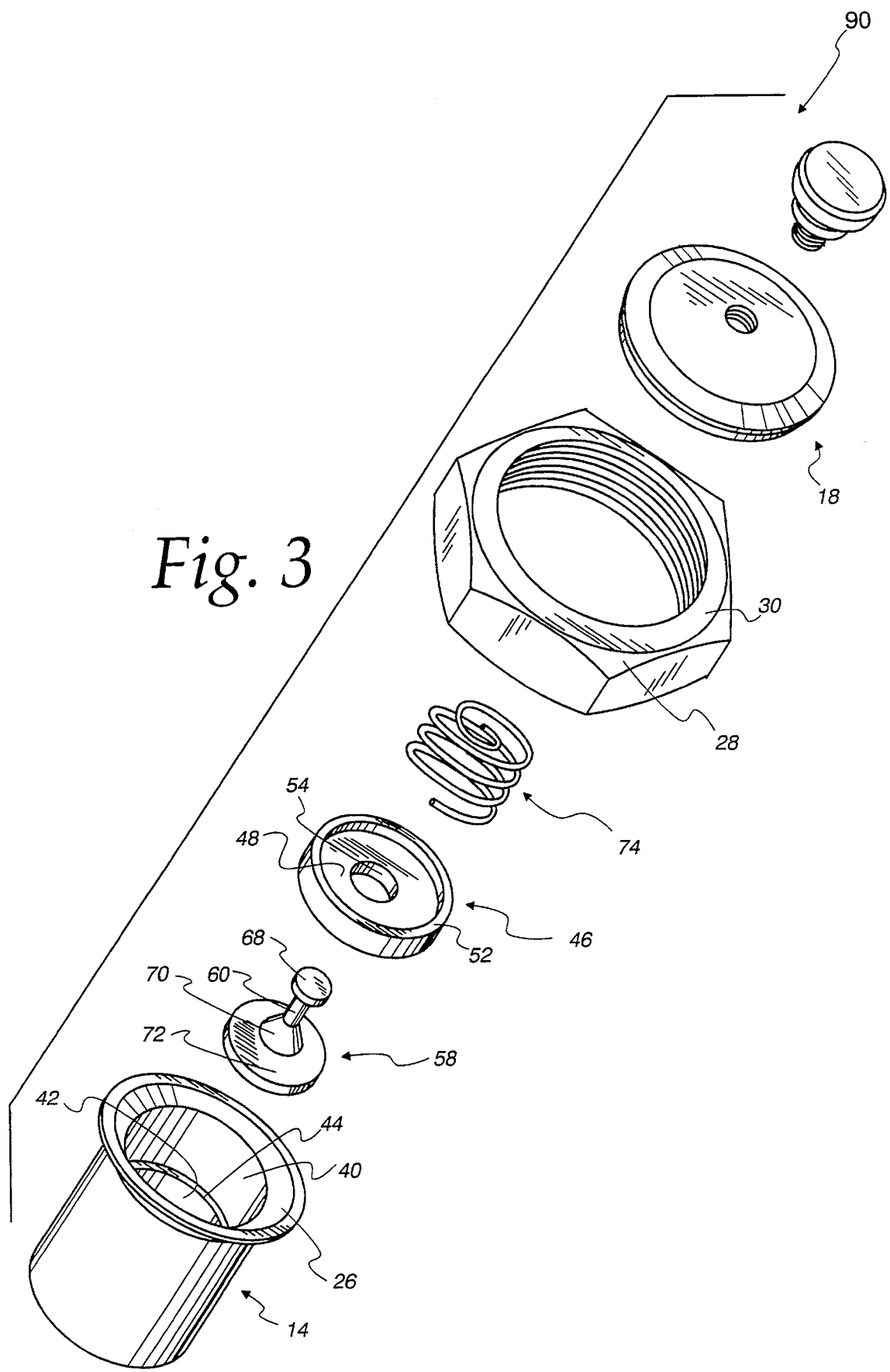
FIG. 3 is an exploded perspective view of the vacuum breaker valve assembly shown in FIG. 2.

Referring more specifically to FIGS. 2 and 3, the cylindrical wall 16 of the housing 14 has an upper annular wall surface portion 40 and a lower annular wall surface portion 42 with the upper wall surface portion 40 having a diameter which is greater than the diameter of the lower wall surface portion 42, thereby forming an annular shelf 44 between the upper wall surface portion 40 and lower wall surface portion 42 in the housing 14.

A circular flexible seal member 46 is provided having a diameter substantially the same as the diameter of the upper surface 40 such that the seal member 46 is tightly received within the housing 14 and can be seated on the annular shelf 44. The seal member 46 has opposite sides 48 and 50 with an axially extending circumferential rim 52 extending about the periphery of the sides 48 and 50. The seal member 46 has a central opening 54 extending therethrough. The seal member 46 can have a raised portion 56 extending about the opening 54 on side 50 with the raised portion 56 defining a valve seat for a valve member 58.

The valve member 58 includes a stem 60 having two spaced enlarged ends 62 and 64. The enlarged end 62 can include a bottle shape portion 66 which leads to a circular plate 68. At the bottom of the stem a frustoconical portion 70 leads to a bottom circular plate 72. The bottom circular plate 72 has a diameter larger than the diameter of the opening 54 in the seal member 46 such that with the valve member 58 biased against the seal member 46, as described below, the bottom circular plate 72 will engage and seat against the valve seat 56 to seal the opening 54.

Biasing structure is provided to urge the circular plate 72 into engagement with the valve seat 56, and can be in the form of a helical spring 74 mounted between the seal side 48 and the top circular plate 68 about the valve stem 60. The distance across the coils of the helical spring is approximately the same as the inner diameter of the rim 52 so that the helical spring is seated snugly against the seal side 48 and rim 52 and is wrapped at its upper end so as to securely capture the bottle shaped portion 66. The spring 74 and valve member 58 are sized so that with the spring seated against the seal side 48 and capturing the bottle shape portion 66, the spring 74 will be mounted in compression biasing the side 48 and the plate 68 away from each other to normally urge the circular plate 72 against the valve seat 56.

To maintain the seal 52, stem 58, and spring 74 in the above-described assembled state within the housing 14 and to maintain them in the housing 14 should they become separated from one another during valve operation, the housing 14 is provided with an annular bottom wall 76. With the seal member 46 seated on the annular shelf 44 and the lid 18 securely mounted on top of the housing 14, the valve assembly 10 has a first region 82 in the housing 14 between the lid and seal member surface 48 and a second region 84 in the housing between the seal member surface 50 and the bottom wall 76. The bottom wall 76 has a vent hole 78 which allows the housing second region 84 to communicate with the interior of the tank. The lid 18 is provided with a centrally located vent hole 80, which allows the housing first region 82 to communicate with air exterior of the tank. The lid vent hole 80, the seal member opening 54, and the bottom wall vent hole 78 all can be aligned with one another along a central axis of the cylindrical wall 16 to define a flow path for atmospheric air through the housing 14 when a predetermined vacuum pressure condition exists in the interior of the tank.

The helical spring 74 normally urges the circular plate 72 into sealing engagement with the valve seat 76 and the circular plate 68 towards the lid vent hole 80. The top plate 68 has a diameter that is slightly less than the diameter of the lid vent hole 80 so that in the absence of a vacuum within the tank, the plate 68 substantially blocks product access to the lid vent hole 80. In this manner, as the tank is transported, agitation causing the liquid product in the tank to splash will require the splashing liquid to travel through the vent hole 78 around the lower circular plate 72, through the opening 54 and around the upper plate 68, and through the vent hole 80 before leaking out of the tank through the valve assembly 10. In addition, the cylindrical wall 16 can be extended from the bottom wall 76 to form a depending annular protection rim 86 which limits access of splashing product in the tank to the vent hole 78 thereby further limiting the leakage of product through the housing 14 to the exterior of the tank.

To further reduce the possibility of leakage from the housing 14, the vent hole 80 of the lid 18 can be provided with threads 88 to receive a vent cap 90 screwed into the vent hole 80. Referring to FIGS. 4 and 5, the vent cap 90 includes a lower, threaded bolt portion 92 connected to an annular lid abutting portion 94 which is, in turn, connected to a frusto-conical upper portion 96. The vent cap 90 has a central bore 98 which extends through the portions 92, 94 and 96 but does not vertically extend all the way through the vent cap. Instead, the frusto-conical portion 96 has angled channels 99 extending downward from the top of the bore 98 to the slanted surface 100 of the frustoconical portion 96 forming atmospheric air access ports 102 circumferentially spaced around the surface 100. In this manner, both contaminants exterior of the tank to which the valve 10 is mounted and product inside the tank is required to travel a more extensive labyrinth path through the valve 10 than without the cap 90 in place thereby further limiting possible contamination of product in the tank and leakage of product from the tank.

Alternatively the vent cap 90 can be welded in place on lid 18. More preferably, a modified vent cap 104 can be used, as seen in FIG. 6. Vent cap 104 is adapted to be snap-fit onto the lid 18 through the vent hole 80. With vent cap 104, the bottom bolt portion 92 of vent cap 90 need not be provided with threads. Similarly, the vent hole 80 need not be threaded. Instead, vent cap 104 includes a non-threaded bottom bolt portion 106, including a cam skirt 108 at the bottom thereof. The cam skirt 108 has an annular slanted surface 110 configured such that its longest diameter is slightly larger than the diameter of the vent hole 80. In this manner, the vent cap 104 can be forced through the vent hole 80 with surface 110 being slightly deformed as it engages the surface around the hole 80. Once the surface 110 is pressed through the hole 80, the skirt 108 will rebound to its original, underformed configuration to substantially lock the cap 104 on the lid 18. Of course, other means of securing the vent cap to the lid will be apparent to one skilled in the art.

Turning to the operation of the valve assembly 10, the helical spring 74 normally urges the lower plate 72 of the valve member 58 into sealing engagement with the seat 56 of the seal member 46 to thus seal the first region 82 from the second region 84, and therefore the interior of the tank from atmospheric air. As previously discussed, by the choice of the strength of the helical spring 74 used and the preload applied thereto, as by the arrangement of the valve member 58 and the seal member 46, and, more specifically, the distance from the side 48 of the seal member 46 to the upper plate 68 of the valve member 58, a predetermined bias force applied by the spring 74 is effected. Such predetermined bias force is selected so that once a particular vacuum pressure condition is reached in the tank, the valve member 58 is caused to move against the predetermined bias force into an open state wherein atmospheric air freely flows through the housing flow path, i.e., through the vent hole 80, the seal member opening 54, and the bottom wall vent hole 78, into the tank to break the vacuum condition in the tank whereupon the valve member 74 is biased back to its closed state with the lower plate 72 once again seating against the valve seat 56, as previously described.

Thus, the valve assembly 10 of the present invention allows for flow of atmospheric air into a tank having a predetermined vacuum condition therein while limiting the leakage of product in the tank through the housing 14 to the exterior of the tank during transport of the same. Moreover, the arrangement of the seal member 46, valve member 58 and spring 74 is effectively isolated from the impact effects of splashing product in the tank which can tend to dislodge the spring 74 from the valve member 58; and, even if such occurs, the bottom wall 76 of the housing 14 prevents parts from dropping into the tank.

The foregoing disclosure and specific embodiments described are intended to be illustrative of the broad concepts comprehended by the invention.

What is claimed is:

1. In a transport tank for transporting bulk quantities of liquids, a vacuum breaker valve assembly for permitting atmospheric air to enter the transport tank having a vacuum pressure condition therein, the assembly comprising:

a housing mountable to the transport tank and having a wall defining a passageway through the housing a valve member movable within the housing;

means for permitting the valve member to move in response to variations in tank pressure between (1) an open state wherein the atmospheric air external of the tank is allowed to travel through the passageway and into the tank once a predetermined vacuum pressure condition in the tank is reached, and (2) a closed state wherein the passageway is sealed from airflow through the passageway to prevent the atmospheric air travel into the tank when the predetermined vacuum pressure condition in the tank has not been reached;

a housing lid mounted to the housing including a vent hole therethrough for allowing the atmospheric air to enter the housing passageway; and a bottom wall integral with the housing wall and including a vent hole therethrough communicating with the interior of the tank with the bottom wall vent hole being sized sufficiently small to prevent the valve member moving means from fitting therethrough, the housing including an upper region of the passageway and a lower region of the passageway and an airflow restriction opening between the upper and lower regions and having a diameter substantially smaller in size than the diameters of the passageway regions, wherein the valve member closes the restriction opening in the closed state to prevent flow of the air through the restriction opening, and in the open state the valve member allows the air to flow through the restriction opening.

2. The vacuum breaker valve assembly of claim 1 wherein the housing wall is cylindrical and has a central longitudinal axis with the bottom wall and the lid vent holes being aligned along the central axis.

3. In a transport tank for transporting bulk quantities of liquids, a vacuum breaker valve assembly for permitting atmospheric air to enter the transport tank having a vacuum pressure condition therein, the assembly comprising:

a housing mountable to the transport tank and having a wall defining a passageway through the housing;

a valve member movable within the housing;

means for permitting the valve member to move in response to variations in tank pressure between (1) an open state wherein atmospheric air external of the tank is allowed to travel through the passageway and into the tank once a predetermined vacuum pressure condition in the tank is reached, and (2) a closed state wherein the passageway is sealed to prevent the atmospheric air travel into the tank when the predetermined vacuum pressure condition in the tank has not been reached;

a housing lid mounted to the housing including a vent hole therethrough for allowing the atmospheric air to enter the housing passageway; and a bottom wall integral with the housing wall and including a vent hole therethrough communicating with the interior of the tank with the bottom wall vent hole sufficiently small to prevent the valve member moving means from fitting therethrough, wherein the valve member moving means includes a flexible seal member mounted in the housing having opposite sides and an opening therethrough defining a valve seat around the opening with the housing having a first region between the lid and one side of the seal member and a second region between the bottom wall and the other side of the seal member, and means for biasing the valve member into sealing engagement with the seal member valve seat with a predetermined bias force to seal the seal member opening in the closed state, the predetermined vacuum pressure being sufficient to overcome the predetermined bias force to cause the valve member to unseat from the seal member valve seat in the open state.

4. The vacuum breaker valve assembly of claim 2 wherein the valve member comprises a stem extending through the seal member opening and having enlarged ends, and the biasing means comprises a helical spring mounted in compression between one enlarged end of the stem and the one side of the seal member to bias the other enlarged end of the stem against the seal member valve seat to seal the seal member opening and to bias the one enlarged end towards the lid hole with the valve member in the closed state.

5. In a transport tank for transporting bulk quantities of liquids, a vacuum breaker valve assembly for permitting atmospheric air to enter the transport tank having a vacuum pressure condition therein, the assembly comprising:

a housing mountable to the transport tank and having a wall defining a passageway through the housing;

a valve member movable within the housing;

means for permitting the valve member to move in response to variations in tank pressure between (1) an open state wherein atmospheric air external of the tank is allowed to travel through the passageway and into the tank once a predetermined vacuum pressure condition in the tank is reached, and (2) a closed state wherein the passageway is sealed to prevent the atmospheric air travel into the tank when the predetermined vacuum pressure condition in the tank has not been reached, a housing lid mounted to the housing including a vent hole therethrough for allowing the atmospheric air to enter the housing passageway; and a bottom wall integral with the housing wall and including a vent hole therethrough communicating with the interior of the tank with the bottom wall vent hole being sized sufficiently small to prevent the valve member moving means from fitting therethrough, wherein the housing wall is cylindrical and has a central longitudinal axis with the bottom wall and the lid vent holes being aligned along the central axis, and the valve member moving means includes an annular seal member having a central opening therethrough defining a valve seat for the valve member with the seal central opening being aligned along the housing central axis, and the valve member extends through the seal member opening and has an enlarged end which engages the valve seat to seal the seal member opening with the valve member in the closed state.

6. In a transport tank for transporting bulk quantities of food-grade liquids, a vacuum breaker valve assembly for the transport tank, the assembly comprising:

a cup-shaped housing having a cylindrical wall mountable to the tank and an annular bottom wall in the interior of the tank and including a central opening therethrough to communicate with the interior of the tank;

a lid covering the housing outside the tank and having a central opening therethrough to communicate with air outside the tank;

an annular flexible seal member mounted in the housing and having opposed sides and a central opening therethrough with the lid, seal member and bottom wall openings defining a flow path through the housing;

a valve member including enlarged ends and a stem extending therebetween, the stem extending through the seal opening between the lid and housing bottom wall; and biasing means mounted between one stem end and one side of the seal member for normally urging the one stem end towards the lid opening and the other of the stem enlarged ends into engagement with the other side of the seal member to both limit leakage of product in the tank through the housing flow path and to prevent travel of the air from outside the tank through the flow path and to the interior of the tank.

7. The assembly of claim 6 wherein the cylindrical wall has first and second annular inner surface portions of different diameters forming an annular shoulder therebetween in the housing with the seal member being seated on the annular shoulder in the housing.

8. The assembly of claim 6 wherein the biasing means has a predetermined bias force which is selected to allow a predetermined vacuum pressure condition in the interior of the tank to cause the other enlarged end of the stem to move out of engagement with the other side of the seal member against the bias force for permitting the air from outside the tank to travel through the flow path to the interior of the tank.

9. The assembly of claim 6 wherein the housing, lid and valve member are formed from a teflon material and the seal member is formed from a neoprene rubber material.

10. The assembly of claim 6 wherein the biasing means comprises a helical spring mounted in compression between the one stem end and the one side of the seal member.

11. The assembly of claim 6 wherein the housing includes an outwardly flared upper lip and the tank includes a shank with the housing upper lip being supported by the shank.

12. The assembly of claim 11 where the shank is threaded to cooperate with a threaded nut to secure the lid to the housing upper lip.

13. In a transport tank for transporting bulk quantities of food-grade liquids, a vacuum breaker valve assembly for permitting atmospheric air to enter the transport tank having a vacuum pressure condition therein, the assembly comprising:

a cylindrical housing mountable to the tank;

a valve member having a stem with first and second enlarged ends where the valve member is movable in the housing between (1) a first position in which the valve assembly is closed to seal the tank from the atmospheric air, and (2) a second position in which the valve assembly is open to admit the atmospheric air to the tank when the tank reaches a predetermined vacuum pressure condition;

a spring biasing the movable member towards the first position with a predetermined biasing force;

an annular flexible seal member having a central aperture therethrough and opposed sides mounted in the housing with the housing having a first region on one side of the seal member and a second region on the other side of the seal member with the first region communicating with the second region with the valve member in the second position;

an annular bottom housing wall cooperating with the other side of the seal member to define the second region and having a central aperture aligned with the seal central aperture with the stem extending through the seal central aperture having the first enlarged end in the first region and the second enlarged end in the second region with the second enlarged end being sized sufficiently large to prevent the stem from fitting through the bottom wall aperture and dropping into the tank and to close the sealing member aperture sealing the first and second regions from each other with the valve member in the first position; and lid means securely mounted to the housing cooperating with the one side of the sealing member to define the first region and having a central aperture therethrough for entry of the atmospheric air into the housing first region and being aligned with the sealing member and bottom wall apertures with the stem first enlarged end substantially blocking the lid means central aperture to limit leakage of product in the tank through the lid means aperture with the valve member in the first position.

* * * * *

UNITED STATES PATENT AND TRADEMARK OFFICE
CERTIFICATE OF CORRECTION

PATENT NO. : 5,617,893
DATED : Earl D. Webster
INVENTOR(S) : April 8, 1997

It is certified that error appears in the above-indentified patent and that said Letters Patent is hereby corrected as shown below:

Claim 1, column 8, line 4, after "housing" insert --;--.

Claim 3, column 8, line 62, after "hole" insert --being sized--.

Claim 4, column 9, line 11, change "claim 2" to --claim 3--.

Signed and Sealed this

Fifteenth Day of July, 1997

Attest:

BRUCE LEHMAN

Attesting Officer

Commissioner of Patents and Trademarks